United States Patent [19]

Gum, Jr. et al.

[11] 3,758,616

[45] Sept. 11, 1973

[54] 1-BROMO-1-(2,2-DICHLORO OR (2-BROMO-2-CHLORO)-2-NITROETHYL)-CYCLOPENTANE

[75] Inventors: Wilson F. Gum, Jr.; David A. Nelson, both of Midland, Mich.

[73] Assignee: The Dow Chemical Company, Midland, Mich.

[22] Filed: Sept. 15, 1972

[21] Appl. No.: 289,323

[52] U.S. Cl............. 260/644, 204/162 R, 260/999, 424/349
[51] Int. Cl............................................. C07c 79/08
[58] Field of Search..................................... 260/644

[56] References Cited
UNITED STATES PATENTS
3,488,396  1/1970  Frankel et al...................... 260/644
3,646,228  2/1972  Frankel et al...................... 260/644

Primary Examiner—Leland A. Sebastian
Attorney—William M. Yates et al.

[57] ABSTRACT

1-Bromo-1-(2,2-dichloro or (2-bromo-2-chloro)-2-nitroethyl)cyclopentane which corresponds to the formula

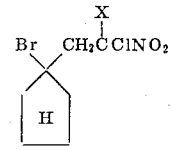

wherein X represents chloro or bromo are prepared. These compounds have been found to have fungicidal, bacteriocidal and nematocidal activity.

3 Claims, No Drawings

1-BROMO-1-(2,2-DICHLORO OR (2-BROMO-2-CHLORO)-2-NITROETHYL)-CYCLOPENTANE

PRIOR ART

Various halonitromethyl alkanes have been prepared by the reaction of halonitromethane or ethane with olefins as shown by Baskakov et al. Zhur. Obsch. Khim 29 1203 (1959). However, no stable halonitromethyl cycloalkanes have been produced. The halonitromethanes themselves have been taught in U. S. Pat. No. 3,159,686.

SUMMARY OF THE INVENTION

The present invention is directed to the novel compounds 1-bromo-1-(2,2-dichloro or (2-bromo-2-chloro)--2-nitroethyl)cyclopentane which correspond to the formula

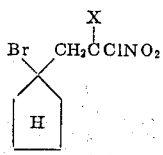

wherein X represents chloro or bromo.

The novel compounds of the present invention are liquids having very slight solubility in water and very good solubility in conventional organic solvents such as acetone, benzene, dichloromethane, carbon tetrachloride, ethanol and isopropanol. These novel compounds have been found to have utility as active constituents in fungicidal, bacteriocidal and nematocidal compositions.

1-Bromo-1-(2,2-dichloro-2-nitroethyl)cyclopentane and 1-bromo-1-(2-bromo-2-chloro-2-nitroethyl)cyclopentane can be prepared by reacting bromodichloronitromethane or dibromochloronitromethane (depending upon the product desired) with methylenecyclopentane in the presence of an irradiation light source, i.e., source of ultraviolet light. The reaction can be characterized as follows:

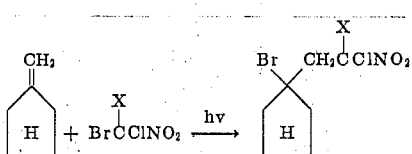

wherein X is as hereinbefore defined.

In carrying out this reaction, a solution is prepared containing the methylenecyclopentane and the bromodichloronitromethane or dibromochloronitromethane in a solvent (reaction medium) such as for example, benzene, n-hexane, toluene or heptane. The reaction solution is placed in a photochemical reaction vessel equipped with an ultraviolet light source, a cooling coil, a thermocouple, a nitrogen bubbler and an agitation means.

Since the reaction consumes the reactants in amounts representing equimolecular proportions, these amounts for the most part can be employed. It has been found however that an increase in yield can be obtained by employing an excess of the bromodichloronitromethane or dibromochloronitromethane. Therefore, it is preferred to employ from 1 mole of the nitromethane reactant per mole of the methylenecyclopentane, up to 3 moles or more of the nitromethane reactant per mole of the methylenecyclopentane.

The reaction is initiated by sparging the reaction mixture with nitrogen for a period of about 30 minutes and thereafter irradiating the mixture for a period of about 8 hours while the temperature is maintained between about 25° and about 30°C. Upon completion of the reaction, the solvent is removed by evaporation under reduced pressure and the crude reaction product purified by distillation.

DESCRIPTION OF SOME PREFERRED EMBODIMENTS

The following examples serve to illustrate the practice of the present invention but are not intended to be limitations on the overall scope of the same.

EXAMPLE I:

1-Bromo-1-(2,2-Dichloro-2-Nitroethyl)Cyclopentane

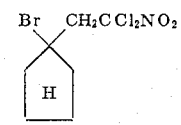

A solution was prepared containing 20.5 grams (0.25 mole) of methylenecyclopentane and 52.2 grams (0.25 mole) of bromodichloronitromethane ($CCl_2BrNO_2$) in 500 milliliters of benzene. The solution was sparged with nitrogen for 30 minutes and thereafter irradiated with a 450 watt Hanovia sunlamp for 8 hours while the temperature was maintained at between 25° and 30°C. The reaction mixture was distilled at 40°C. under vacuum to remove the solvent followed by a distillation at 1.0 millimeter of mercury (mm), to remove excess bromodichloronitromethane. This product was thereafter distilled at 0.1 to 0.8 mm and the 1-bromo-1-(2,2-dichloro-2-nitroethyl)-cyclopentane product thus recovered boiled at 60°—66°C. at 0.2 mm. The structure of the product was confirmed by nuclear magnetic resonance spectrum and infrared analysis.

In an analogous manner employing generally the method of Example I and dibromochloronitromethane as a reactant, 1-bromo-1-(2-bromo-2-chloro-2-nitroethyl)cyclopentane having a molecular weight of 335.37 is prepared.

The compounds of the present invention are adapted to be employed as the active toxicant in bacterial, fungicidal or nematocidal compositions. For such uses, the compounds can be employed in an unmodified form or dispersed on a finely divided solid and employed as a dust. Such mixtures can also be dispersed in water with or without the aid of a surface active agent and the resulting aqueous suspension employed as a spray. In other procedures, the products can be employed as the active constituent in solvent solutions, oil-in water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing the toxicant in concentrations usually from about 0.1 to about 10,000 parts or more by weight of the compound per million parts of such composition.

In a representative operation, 1-bromo-1-(2,2-dichloro-2-nitroethyl)cyclopentane when employed as the sole toxicant in a nutrient agar at a concentration of 500 parts by weight per million parts of agar was found to give 100 percent kill and control of the organisms Candida albicans, Trichophyton mentagrophytes, Bacillus subtilis, Candida pelliculosa, Pullularia pullulans, Salmonella typhosa and Cephaloascus fragans.

In another representative operation, 1-bromo-1--(2,2-dichloro-2-nitroethyl)cyclopentane was found to give 100 percent kill and control of the rootknot nematode when soil containing the nematode was treated with the compound as the sole toxicant in the amount of 1.5 parts by weight per million parts of the soil.

What is claimed is:

1. A compound corresponding to the formula

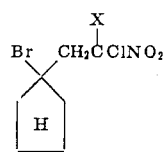

wherein X represents chloro or bromo.

2. The compound of claim 1 which is 1-bromo-1--(2,2-dichloro-2-nitroethyl)cyclopentane.

3. The compound of claim 1 which is 1-bromo--1-(2-bromo-2-chloro-2-nitroethyl)cyclopentane.

* * * * *